(12) United States Patent
Tanaka et al.

(10) Patent No.: US 10,090,935 B2
(45) Date of Patent: Oct. 2, 2018

(54) COMMUNICATION DEVICE, COMMUNICATION METHOD, AND COMMUNICATION SYSTEM

(71) Applicant: SONY CORPORATION, Tokyo (JP)

(72) Inventors: Katsuyuki Tanaka, Kanagawa (JP); Yoshihito Ishibashi, Tokyo (JP); Yuji Ide, Tokyo (JP); Masahiro Uno, Tokyo (JP); Kazuhisa Funamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/527,391

(22) PCT Filed: Sep. 11, 2015

(86) PCT No.: PCT/JP2015/075819
§ 371 (c)(1),
(2) Date: May 17, 2017

(87) PCT Pub. No.: WO2016/084458
PCT Pub. Date: Jun. 2, 2016

(65) Prior Publication Data
US 2017/0331564 A1    Nov. 16, 2017

(30) Foreign Application Priority Data

Nov. 27, 2014  (JP) ................................ 2014-239445

(51) Int. Cl.
*H04B 5/00* (2006.01)
*H04B 13/00* (2006.01)
(Continued)

(52) U.S. Cl.
CPC .......... *H04B 13/005* (2013.01); *H04B 5/0025* (2013.01); *H04W 76/002* (2013.01); *H04W 76/40* (2018.02)

(58) Field of Classification Search
CPC .. H04B 5/0031; H04B 13/005; H04W 76/025
(Continued)

(56) References Cited

U.S. PATENT DOCUMENTS 9,305,194 B2 * 4/2016 Adrangi ............. G06K 7/10237
9,331,743 B2 * 5/2016 Gilad-Bachrach ....... H04B 5/00
(Continued)

FOREIGN PATENT DOCUMENTS

CN   101371530 A   2/2009
JP   2004-260800 A   9/2004
(Continued)

OTHER PUBLICATIONS

Extended European Search Report of EP Patent Application No. 15862691.1, dated Jul. 26, 2018, 8 pages.

*Primary Examiner* — Simon Nguyen
(74) *Attorney, Agent, or Firm* — Chip Law Group

(57) ABSTRACT

A communication device includes a communication unit that communicates with a first communication device or a second communication device by using human body communication, with regard to setting information for establishing communication between the first communication device and the second communication device. A communication device includes a communication unit that communicates with a third communication device by using human body communication with regard to setting information for establishing communication with a second communication device, and establishes communication with the second communication device based on the setting information. A communication device includes a communication unit that communicates with a third communication device by using human body communication with regard to setting information for establishing communication with a first communication device,
(Continued)

and establishes communication with the first communication device based on the setting information.

21 Claims, 9 Drawing Sheets

(51) Int. Cl.
    *H04W 76/00*           (2018.01)
    *H04W 76/40*           (2018.01)

(58) Field of Classification Search
    USPC .............................................. 455/41.1–41.3
    See application file for complete search history.

(56) References Cited

U.S. PATENT DOCUMENTS

| | | | |
|---|---|---|---|
| 2009/0070472 A1 | 3/2009 | Baldus et al. | |
| 2010/0330910 A1* | 12/2010 | Yan | H04B 5/0031 455/41.2 |
| 2012/0023169 A1* | 1/2012 | Kang | H04B 13/005 709/205 |
| 2013/0194632 A1* | 8/2013 | Kishimoto | G06F 3/12 358/1.15 |
| 2015/0093988 A1* | 4/2015 | Konanur | H04B 5/0031 455/41.1 |
| 2015/0163221 A1* | 6/2015 | Bolin | G07C 9/00309 726/7 |
| 2015/0358088 A1* | 12/2015 | Eim | H04B 13/005 455/418 |
| 2016/0127050 A1* | 5/2016 | Antoine | H04W 4/008 398/40 |
| 2016/0143066 A1* | 5/2016 | Bengtsson | H04W 76/02 370/338 |

FOREIGN PATENT DOCUMENTS

| | | |
|---|---|---|
| JP | 2006-254344 A | 9/2006 |
| JP | 2009-212732 A | 9/2009 |
| JP | 2009-218845 A | 9/2009 |
| JP | 2014-215802 A | 11/2014 |
| WO | 2007/084807 A1 | 7/2007 |

\* cited by examiner

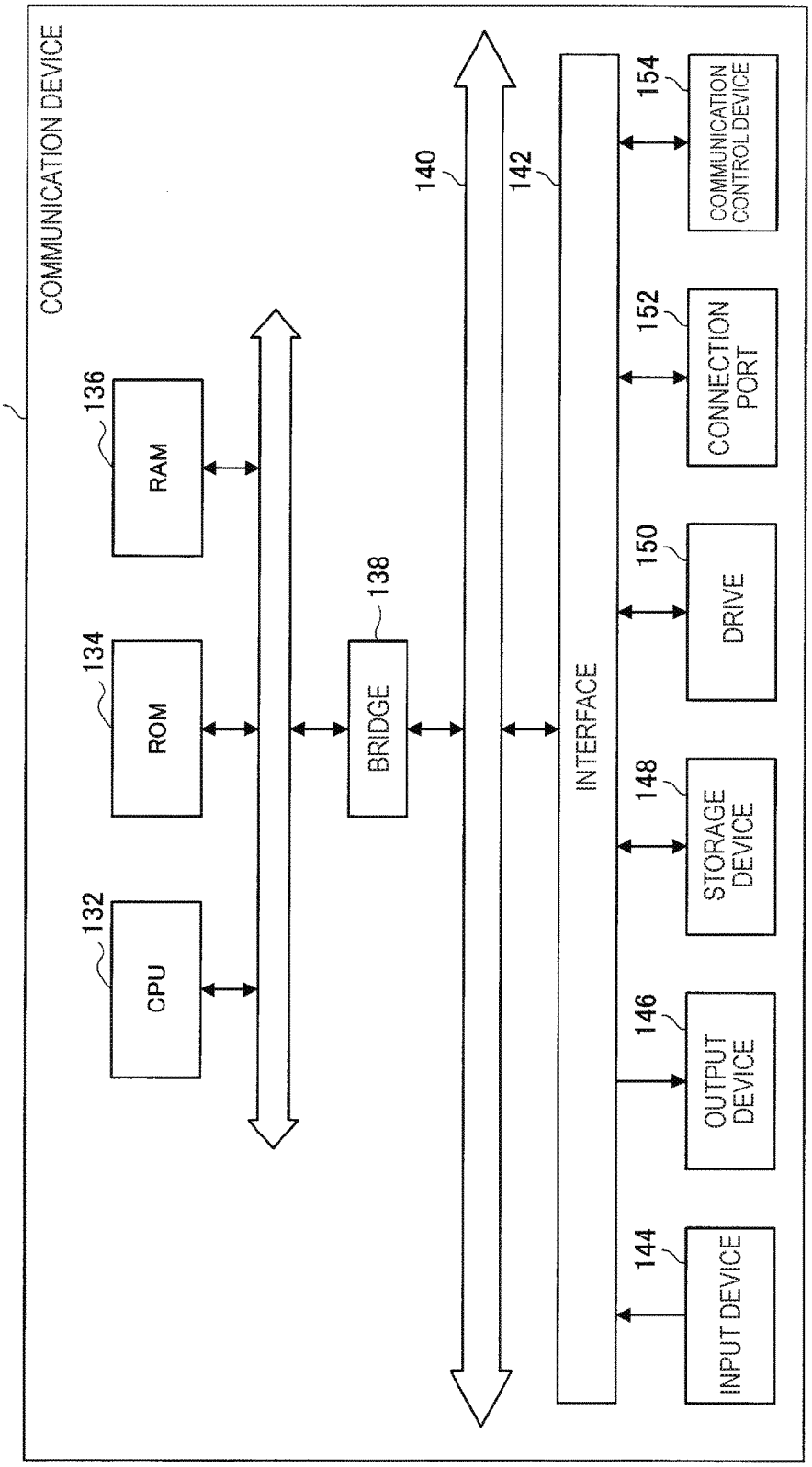

COMMUNICATION DEVICE, COMMUNICATION METHOD, AND COMMUNICATION SYSTEM

CROSS REFERENCE TO RELATED APPLICATIONS

This application is a U.S. National Phase of International Patent Application No. PCT/JP2015/075819 filed on Sep. 11, 2015, which claims priority benefit of Japanese Patent Application No. JP 2014-239445 filed in the Japan Patent Office on Nov. 27, 2014. Each of the above-referenced applications is hereby incorporated herein by reference in its entirety.

TECHNICAL FIELD

The present disclosure relates to a communication device, a communication method, and a communication system.

BACKGROUND ART

In recent years, various communication methods are developed, and the communication methods are used for a purpose, usage, or the like of communication. Further, what is called a handover technology, in which a plurality of communication means compatible with the communication methods that are different from each other are automatically switched to perform communication, is developed.

For example, in Patent Literature 1 and Patent Literature 2 disclose an invention of a communication device in which authentication information for Bluetooth (registered trademark) communication (hereinafter, also referred to as BT communication) is transmitted by near field communication (NFC) communication, and transmission and reception of data are performed by using the BT communication based on the authentication information. Thereby, a user can utilize the BT communication, without performing operation for the authentication information of the BT communication.

CITATION LIST

Patent Literature

Patent Literature 1: JP 2010-213334A
Patent Literature 2: JP 2009-218845A

DISCLOSURE OF INVENTION

Technical Problem

However, in the invention disclosed in Patent Literature 1 and Patent Literature 2, the user brings the communication device itself close to a communication partner device in order to cause the communication device to perform the NFC communication. Hence, if the communication device is of an inconvenient size or weight for the user to carry, the user endures the burden.

Thus, the present disclosure proposes a new and improved communication device, a communication method, and a communication system, which can reduce the burden of the user, while maintaining convenience of the user at the time of communication establishment.

Solution to Problem

According to the present disclosure, there is provided a communication device including a communication unit that communicates with a first communication device or a second communication device by using human body communication, with regard to setting information for establishing communication between the first communication device and the second communication device.

In addition, according to the present disclosure, there is provided a communication device including a communication unit that communicates with a third communication device by using human body communication with regard to setting information for establishing communication with a second communication device, and establishes communication with the second communication device based on the setting information.

In addition, according to the present disclosure, there is provided a communication device including a communication unit that communicates with a third communication device by using human body communication with regard to setting information for establishing communication with a first communication device, and establishes communication with the first communication device based on the setting information.

In addition, according to the present disclosure, there is provided a communication method including: transmitting setting information for establishing communication between a first communication device and a second communication device to the first communication device or the second communication device by using human body communication; and establishing the communication between the first communication device and the second communication device on a basis of the setting information.

In addition, according to the present disclosure, there is provided a communication system including: a function for transmitting setting information for establishing communication between a first communication device and a second communication device to the first communication device or the second communication device by using human body communication; and a function for establishing the communication between the first communication device and the second communication device on a basis of the setting information.

Advantageous Effects of Invention

As described above, the present disclosure supplies the communication device, the communication method, and the communication system, which can reduce the burden of the user, while maintaining the convenience of the user at the time of the communication establishment. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is an explanatory diagram that illustrates a hardware configuration of a communication device according to the present disclosure.

MODE(S) FOR CARRYING OUT THE INVENTION

Figure 1:
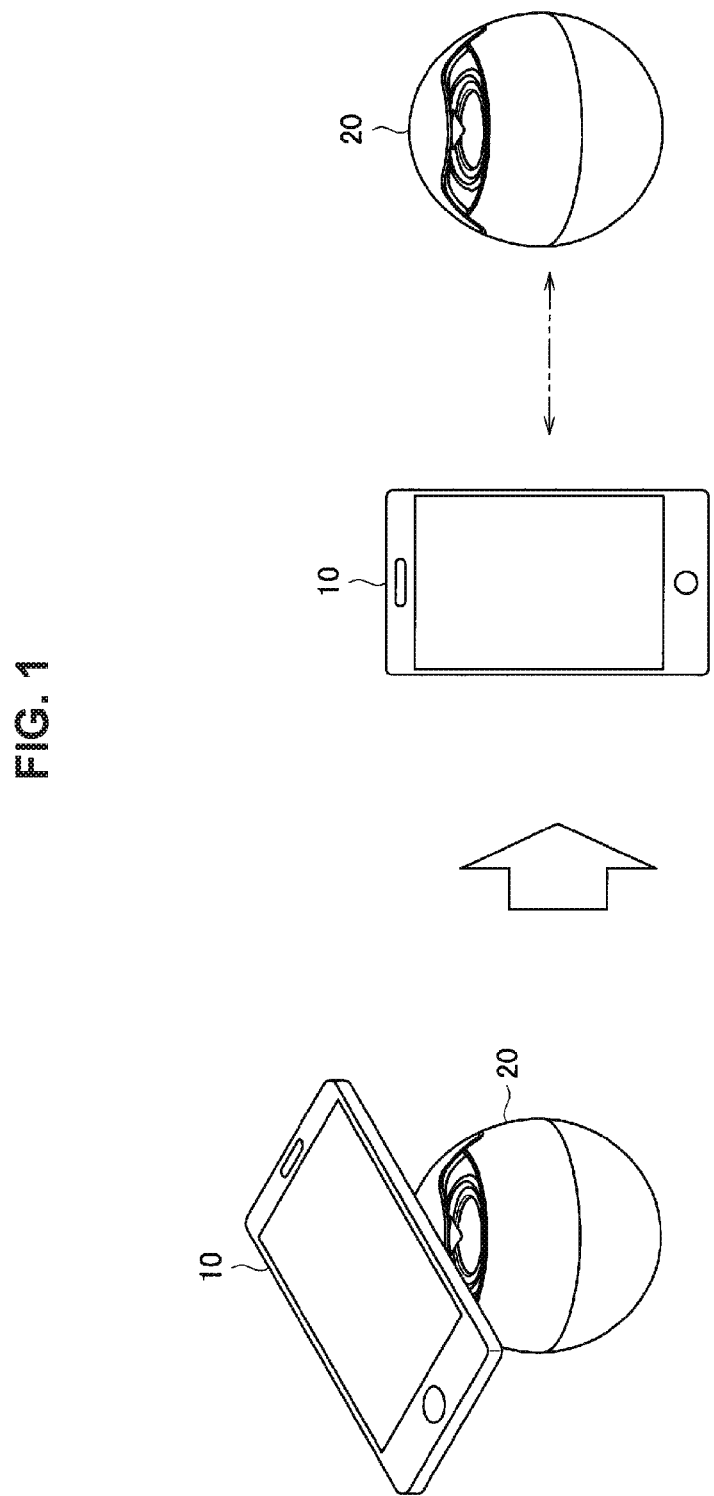
FIG. 1 is a diagram for describing a problem of a communication system that utilizes NFC of the past.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be made in the following order.
1. Overview of Communication System According to Embodiment of Present Disclosure
2. First Embodiment (Example That Transmits Setting Information of MD to SD via Human Body Communication)
3. Second Embodiment (Example That Transmits Setting Information of SD to MD via Human Body Communication)
4. Hardware Configuration According to Embodiment of Present Disclosure
5. Conclusion

1. OVERVIEW OF COMMUNICATION SYSTEM ACCORDING TO EMBODIMENT OF PRESENT DISCLOSURE

Figure 2:
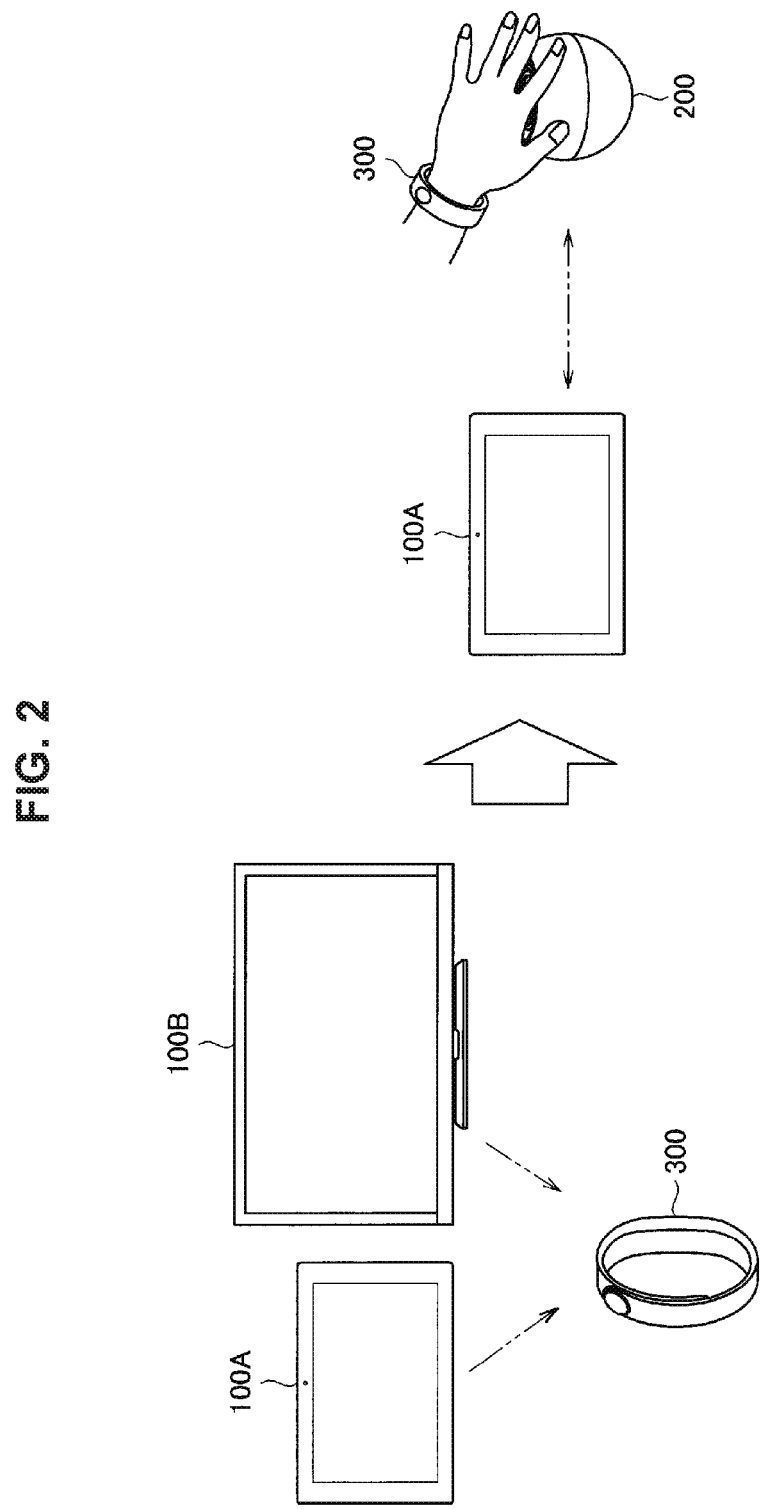
FIG. 2 is a diagram for describing an overview of a control system according to an embodiment of the present disclosure.

First, a problem of a communication system of the past and an overview of a control system according to an embodiment of the present disclosure will be described. FIG. 1 is a diagram for describing a problem of a communication system that utilizes the NFC of the past, and FIG. 2 is a diagram for describing an overview of a control system according to an embodiment of the present disclosure.

The communication system of the past is configured with a plurality of communication devices. Each of the communication devices has a wireless communication function for performing communication by using two types of communication methods. Then, the communication system uses one of the communication methods to transmit information for establishing communication by the other communication method to the communication device of a communication partner.

For example, a communication device 10 and a communication device 20 that configure the communication system of the past can have a function for performing the NFC communication and the BT communication. As illustrated in FIG. 1, the communication device 10 is moved to a position close to the communication device 20, and transmits setting information of the BT communication to the communication device 20 via the NFC communication. The communication device 20 that has received the setting information of the BT communication establishes the BT communication with the communication device 10 by using the setting information.

Here, when the NFC communication is used in the transmission of the setting information of the BT communication or the like, the user brings the communication device itself close to the device of the communication partner in order to cause the communication device to perform the NFC communication. For example, the user brings the communication device 10 illustrated in FIG. 1 close to the communication device 20. Also, when the communication device 10 is installed in a first floor and the communication device 20 is installed in a second floor, the communication device 10 is moved from the first floor to the second floor. Hence, if the communication device is of an inconvenient size or weight for the user to carry, the user has endured the burden. Also, when the communication device 10 is a device for which detachment is difficult, for example a device like a set-top box, detachment was cumbersome for the user at the time of the movement.

Also, the communication connection is not established in the NFC communication when the respective positions of the antennas of the communication devices match, and the match of the positions of the antennas requires comparatively high accuracy, and thus actually the establishment of the communication connection has been difficult in some cases. For example, in a state in which circle coils that form the antennas overlap each other in an approximately half area of the circles, the communication is difficult, and a state in which the circle coils overlap each other in approximately 80% of the areas of the circles is generally desirable to perform the NFC communication. Also, when the shapes of the antennas differ from each other, the shapes of the antennas are not visually confirmed by the user generally, and thus the position adjustment of the antennas is more difficult.

Thus, in the communication system according to an embodiment of the present disclosure, a third communication device communicates by using human body communication with a first communication device or a second communication device, with regard to the setting information for establishing the communication between the first communication device and the second communication device. Then, the communication is established between the first communication device and the second communication device on the basis of the setting information.

The communication system according to an embodiment of the present disclosure is configured with the first to third communication devices as described above. Each of the first to third communication devices performs the communication with another communication device by using the human body communication and the communication of another communication method, for example the BT communication. Also, the third communication device is worn on a human body, and performs intermediation of the setting information of the other communication device by using the human body communication, and the first and second communication devices establish the communication of the other communication method on the basis of the setting information.

For example, as illustrated in FIG. 2, the information system according to an embodiment of the present disclosure can be configured with a band 300 as the third communication device, a tablet terminal 100A and a display 100B as the first communication device, and a speaker 200 as the second communication device.

First, the band 300 receives the setting information for establishing the BT communication from the tablet terminal 100A and the display 100B, and stores the received setting information, as illustrated in a left diagram of FIG. 2.

Next, the band 300 is worn on the user, and the user touches the speaker 200 while wearing the band 300, as illustrated in a right diagram of FIG. 2. The setting information of the tablet terminal 100A stored in the band 300 is transmitted from the band 300 to the speaker 200 via the human body communication, when the user touches the speaker 200. Then, the speaker 200 establishes the BT communication with the tablet terminal 100A by using the received setting information of the tablet terminal 100A.

As described above, in the communication system according to an embodiment of the present disclosure, the third communication device communicates by using the human body communication with the first communication device or the second communication device, with regard to the setting information for establishing the communication between the first communication device and the second communication device. Then, the communication between the first communication device and the second communication device is established on the basis of the setting information. Hence, the user can establish the communication between the communication devices without moving the first and second communication devices to a close position, and can reduce the burden of the user, while maintaining the convenience of the user at the time of the communication establishment. Although FIG. 2 illustrates the communication device of a band shape as an example of the third communication device, the third communication device is not limited thereto if the third communication device is a device worn on the human body or held by the human body. Although the tablet terminal, the display, and the speaker are illustrated as an example of the first communication device 100 and the second communication device, the first communication device and the second communication device may be other communication terminals, display devices, output devices, or the like capable of communication.

Note that, in the following, the communication device 100, the communication device 200, and the communication device 300 are also referred to as a master device (MD), a slave device (SD), and a wearable device (WD). Also, for convenience of explanation, each of the communication device 100 and the like in the first and second embodiments are distinguished by suffixing numbers corresponding to the embodiments, like a communication device 100-1 and a communication device 100-2.

2. FIRST EMBODIMENT (EXAMPLE THAT TRANSMITS SETTING INFORMATION OF MD TO SD VIA HUMAN BODY COMMUNICATION)

In the above, the overview of the communication system according to an embodiment of the present disclosure has been described. Next, a communication system according to a first embodiment of the present disclosure will be described. In the present embodiment, the setting information of the first communication device is transmitted to the second communication device via the third communication device, by using the human body communication.

2-1. Configuration of Communication System

Figure 3:
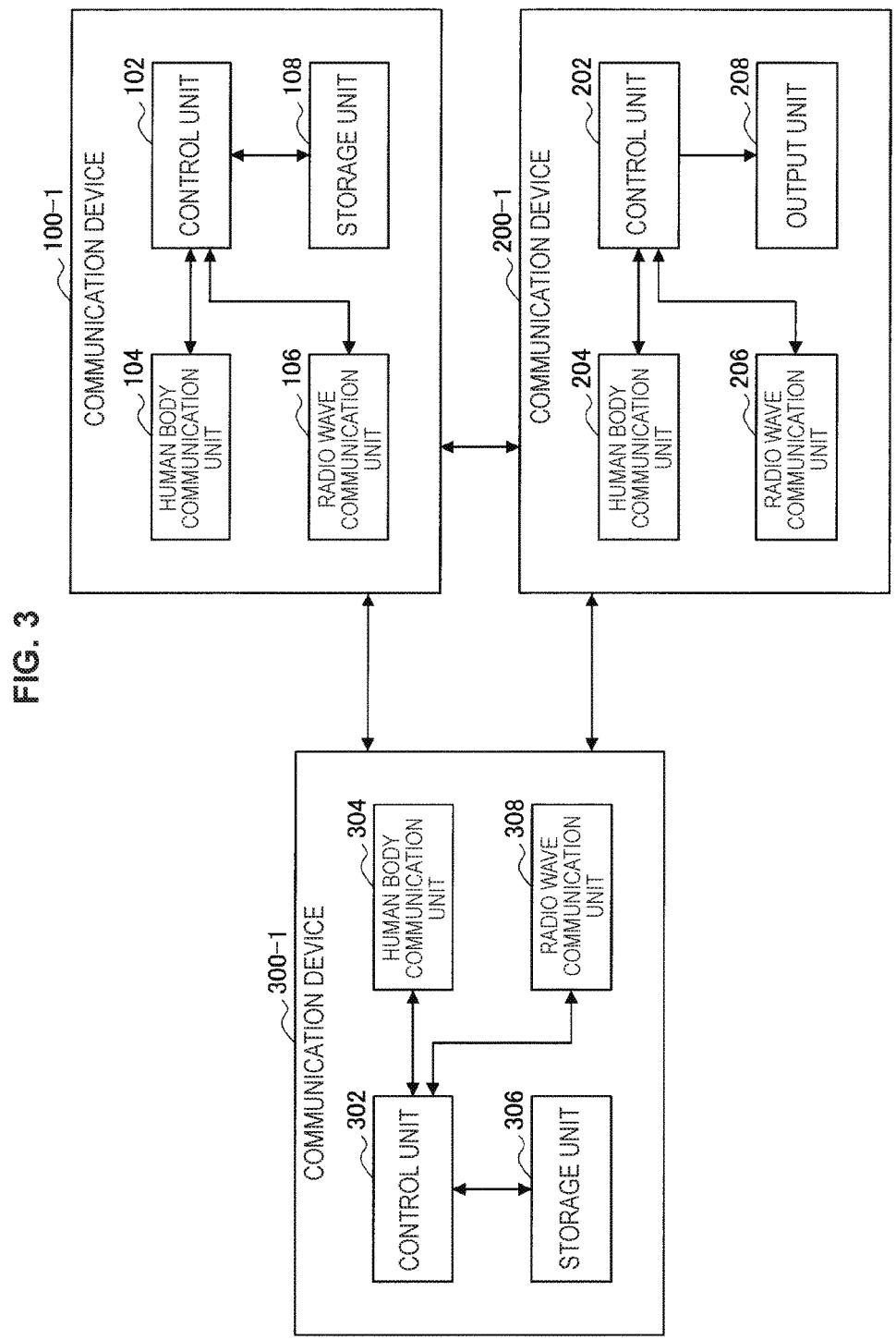
FIG. 3 is a block diagram illustrating a schematic functional configuration of a communication device according to a first embodiment of the present disclosure.

First, a configuration of a communication device 100-1, a communication device 200-1, and a communication device 300-1 according to the first embodiment of the present disclosure will be described with reference to FIG. 3. FIG. 3 is a block diagram illustrating a schematic functional configuration of the communication device 100-1, the communication device 200-1, and the communication device 300-1 according to the first embodiment of the present disclosure.

(Configuration of Communication Device 100-1)

The communication device 100-1 includes a control unit 102, a human body communication unit 104, a radio wave communication unit 106, and a storage unit 108, as illustrated in FIG. 3. For example, the communication device 100-1 can be a portable communication terminal or the like which is operated by the user.

The control unit 102 controls the operation of the communication device 100-1 overall. Specifically, the control unit 102 controls the human body communication unit 104 and the radio wave communication unit 106. For example, the control unit 102 starts operating and stops operating the human body communication unit 104 and the radio wave communication unit 106, and instructs data transmission or the like.

The human body communication unit 104 performs communication via the human body with another communication device, as a part of the communication unit. Specifically, the human body communication unit 104 transmits the setting information for establishing the communication with the communication device 200-1. For example, the human body communication unit 104 transmits the setting information of the BT communication of the communication device 100-1, as the first setting information, to the communication device 300-1. The setting information can be authentication information such as pairing information, for example. Note that the human body communication unit 104 includes a communication electrode and a reference electrode (not depicted), and performs the communication by generating an electric potential difference between the reference electrode and the communication electrode.

The radio wave communication unit 106 performs the communication with another communication device via radio wave, as a part of the communication unit. Specifically, the radio wave communication unit 106 receives a connection request that is transmitted from the communication device 200-1 on the basis of the setting information transmitted by the human body communication unit 104, and establishes the communication based on the connection request. Then, the radio wave communication unit 106 performs transmission and reception of data with the communication device 200-1. For example, the radio wave communication unit 106 performs the communication by using a wireless communication method such as Bluetooth or WiFi (registered trademark).

The storage unit 108 stores the transmitted information. Specifically, the storage unit 108 stores data that is transmitted to the communication device 200-1 and is used in the communication device 200-1. For example, the data can be audio or image data, an operation program, or the like. Also, the setting information may be stored in the storage unit 108 in advance. Note that an acquisition unit that acquires the data from the outside of the communication device 100-1 may be provided instead of the storage unit 108.

(Configuration of Communication Device 200-1)

Also, the communication device 200-1 includes a control unit 202, a human body communication unit 204, a radio wave communication unit 206, and an output unit 208, as illustrated in FIG. 3. For example, the communication device 200-1 can be a stationary communication device.

The control unit 202 controls the operation of the communication device 200-1 overall. Specifically, the control unit 202 controls the human body communication unit 204 and the radio wave communication unit 206. Also, the control unit 202 controls the output unit 208. For example, the control unit 202 supplies data received by the radio wave communication unit 206 to the output unit 208, and causes the output unit 208 to perform output based on the data.

The human body communication unit 204 performs the communication with another communication device via the human body, as a part of the communication unit. Specifically, the human body communication unit 204 receives the setting information for establishing the communication with the communication device 100-1. For example, the human body communication unit 204 receives the setting information of the BT communication of the communication device 100-1 from the communication device 300-1.

The radio wave communication unit 206 performs the communication with another communication device via radio wave, as a part of the communication unit. Specifically, the radio wave communication unit 206 establishes the communication with the communication device 100-1 on the basis of the setting information received by the human body communication unit 204, and performs transmission and reception of data.

The output unit 208 performs output on the basis of the instruction of the control unit 202. Specifically, the output unit 208 performs the output based on the data received by the radio wave communication unit 206. For example, the output unit 208 can output audio, image, vibration, or the like.

(Configuration of Communication Device 300-1)

Also, the communication device 300-1 includes a control unit 302, a human body communication unit 304, a storage unit 306, and a radio wave communication unit 308, as illustrated in FIG. 3. For example, the communication device 300-1 can be a communication device that is portable and is worn on the body of the user or held by the body of the user.

The control unit 302 controls the operation of the communication device 300-1 overall. Specifically, the control unit 302 controls the human body communication unit 304. For example, the control unit 302 starts operating and stops operating the human body communication unit 304, and instructs data transmission or the like.

The human body communication unit 304 performs the communication with another communication device via the human body, as a part of the communication unit. Specifically, the human body communication unit 304 performs the transmission and reception of the setting information for establishing the communication between the communication device 100-1 and the communication device 200-1. For example, the human body communication unit 304 receives the setting information of the BT communication of the communication device 100-1 from the communication device 100-1, and transmits the setting information of the BT communication to the communication device 200-1.

The storage unit 306 stores the transmitted and received setting information. Specifically, the storage unit 306 stores the setting information received by the human body communication unit 304. Note that the setting information is read out from the storage unit 306 by the human body communication unit 304, and is transmitted.

The radio wave communication unit 308 performs the communication with another communication device via radio wave, as a part of the communication unit. Specifically, the radio wave communication unit 308 communicates with the communication device 100-1 or 200-1 or another communication device.

2-2. Process of Communication System

Figure 4:
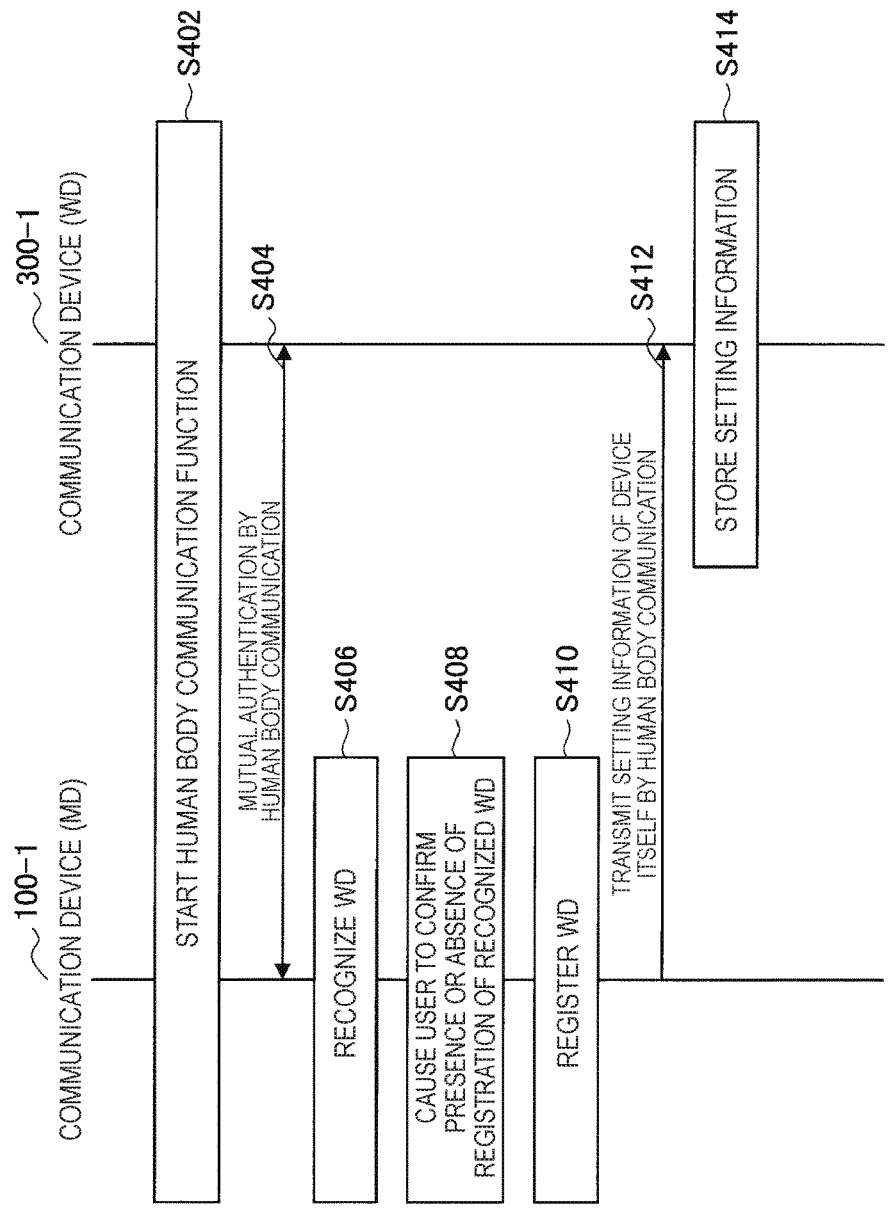
FIG. 4 is a sequence diagram conceptually illustrating an advance registration process of setting information in a communication system according to the present embodiment.
Figure 5:
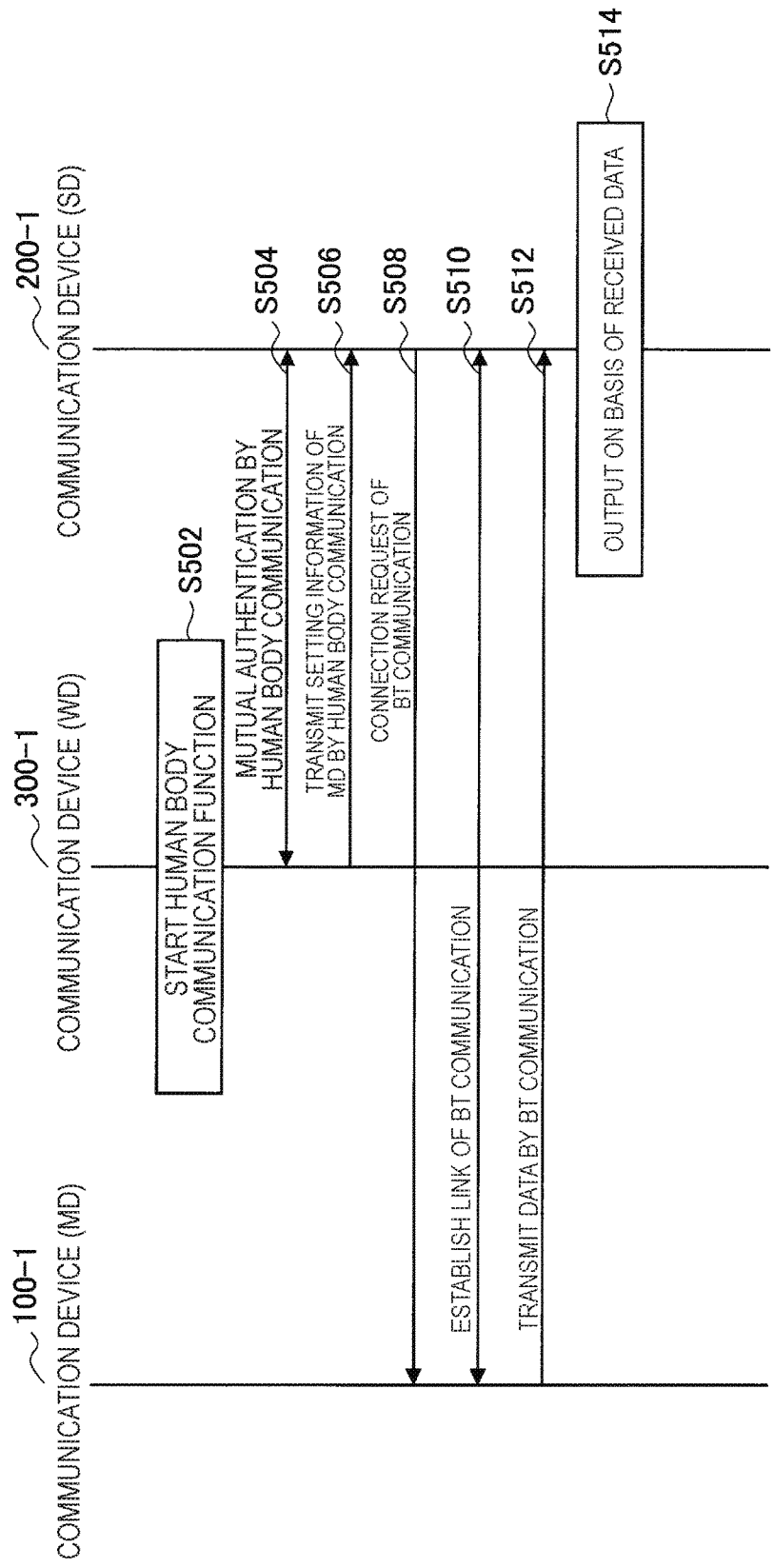
FIG. 5 is a sequence diagram conceptually illustrating a radio wave communication establishment process in a communication system according to the present embodiment.

Next, a process of the communication system in the present embodiment will be described with reference to FIGS. 4 and 5. First, an advance registration process of the setting information will be described with reference to FIG. 4. FIG. 4 is a sequence diagram conceptually illustrating the advance registration process of the setting information in the communication system according to the present embodiment.

(Advance Registration Process of Setting Information)

First, an MD-1 and a WD-1 start a human body communication function (step S402). Specifically, the control units 102 and 302 start operating the human body communication units 104 and 304, respectively. For example, the MD-1 includes an operation unit such as a touch panel separately, and when user operation to the operation unit, for example start instruction operation of the human body communication, is performed, the control unit 102 starts operating the human body communication unit 104. Also, the WD-1 includes an operation unit such as a button separately, and when user operation to the operation unit, for example operation such as button press by the user, is performed, the control unit 302 starts operating the human body communication unit 304. Note that the control units 102 and 302 may cause the human body communication units 104 and 304 periodically to start operating. Also, in the MD-1, start methods of the human body communication function are set, and the start method may be changed by the setting. For example, the setting can switch between the start by the user operation and the periodical start.

Next, the MD-1 and the WD-1 perform mutual authentication by the human body communication (step S404). Specifically, the human body communication unit 104 and the human body communication unit 304 transmit the respective authentication information, and receive the authentication information of the other. Note that, when the authentication information is shared between the MD-1 and the WD-1 in advance or in the case of specific products, the process of the present step may be skipped.

Next, the MD-1 recognizes the WD-1 (step S406). Specifically, the control unit 102 recognizes the WD-1 as the communication partner, when mutual authentication with the WD-1 is completed normally. Note that, when the mutual authentication is not performed at step S404, the control unit 102 recognizes the WD-1 as a device capable of communication.

Next, the MD-1 causes the user to confirm presence or absence of registration of the detected WD-1 (step S408). Specifically, the control unit 102 presents a fact that the WD-1 is recognized to the user, and causes the user to determine whether or not to register the WD-1. For example, the control unit 102 displays the fact that the WD-1 is recognized on the display unit that is separately included in the MD-1, and causes the user to perform selection operation of presence or absence of registration of the WD-1 in the MD-1, and presence or absence of registration of the MD-1 in the WD-1, that is, supply of the setting information of the MD-1. For example, when the user registers the recognized WD-1 as an unlock device, both of the registrations are selected, and when the user does not register the WD-1 as the unlock device and causes the WD-1 to register the setting information of the MD-1, the registration of the MD-1 in the WD-1 is selected.

Next, the MD-1 registers the WD-1 (step S410). Specifically, when the user selects to register the recognized WD-1 in the MD-1, the control unit 102 causes the storage unit 108 to store the information of the WD-1 such as the authentication information. Note that, when only the registration of the MD-1 in the WD-1 is selected, and when non-registration of the both is selected, the process of the present step is skipped.

Next, the MD-1 transmits the setting information of the device itself by the human body communication (step S412). Specifically, the control unit 102 causes the human body communication unit 104 to transmit the setting information of the BT communication of the MD-1 to the WD-1. Note that, when only the registration of the WD-1 in the MD-1 is selected, and when non-registration of the both is selected, the process is ended.

When the setting information is received, the WD-1 stores the setting information (step S414). Specifically, the control unit 302 causes the storage unit 306 to store the setting information received by the human body communication unit 304.

(Establishment Process of Radio Wave Communication)

Next, an establishment process of the radio wave communication will be described with reference to FIG. 5. FIG. 5 is a sequence diagram conceptually illustrating an establishment process of the radio wave communication in the communication system according to the present embodiment. Note that the description of the substantially same processes as the advance registration process of the setting information will be omitted.

First, the WD-1 starts the human body communication function (step S502), and the WD-1 and the SD-1 perform mutual authentication by the human body communication (step S504). Note that, when the mutual authentication is not performed, the process of the present step is skipped.

Next, the WD-1 transmits the setting information of the MD-1 to the SD-1 by the human body communication (step S506). Specifically, when the mutual authentication by the human body communication is completed, the control unit 302 acquires the setting information of the MD-1 stored in the storage unit 306. Then, the control unit 302 causes the human body communication unit 304 to transmit the acquired setting information of the MD-1 to the SD-1. Note that, when a transmission request of the setting information is received from the SD-1, the control unit 302 may cause the human body communication unit 304 to transmit the setting information of the MD-1.

The SD-1 that has received the setting information of the MD-1 performs a connection request of the BT communication to the MD-1 (step S508). Specifically, when the setting information of the MD-1 is received by the human body communication unit 204, the control unit 202 causes the radio wave communication unit 206 to transmit to the MD-1 the connection request of the BT communication based on the received setting information of the MD-1.

The SD-1 and the MD-1 that has received the connection request of the BT communication establish a link of the BT communication (step S510). Specifically, when the connection request of the BT communication is received from the SD-1, the radio wave communication unit 106 authorizes the SD-1 to connect, and establishes the link of the BT communication with the SD-1.

After establishing the link of the BT communication, the MD-1 transmits the data to the SD-1 by the BT communication (step S512). Specifically, the control unit 102 acquires the data stored in the storage unit 108, and causes the radio wave communication unit 106 to transmit the acquired data to the SD-1. Note that, when the data transmission request is received from the SD-1, the control unit 102 may cause the radio wave communication unit 106 to transmit the data indicating the data transmission request to the SD-1.

The SD-1 that has received the data performs output on the basis of the received data (step S514). Specifically, the control unit 202 supplies the data received by the radio wave communication unit 206 to the output unit 208, and causes the output unit 208 to perform the output based on the data.

Note that the processes of steps S512 and S514 may be performed repeatedly, and the processes of steps S512 and S514 may be performed in parallel, and the data received in step S512 may be buffered in the reception buffer so that the buffered data is used in the process of step S514.

As described above, according to the first embodiment of the present disclosure, the communication device 300-1 communicates with the communication device 100-1 or the communication device 200-1 by using the human body communication, with regard to the setting information for establishing the communication between the communication device 100-1 and the communication device 200-1. Also, the communication device 100-1 communicates with the communication device 300-1 by using the human body communication with regard to the setting information for establishing the communication with the communication device 200-1, and establishes the communication with the communication device 200-1 based on the setting information. Also, the communication device 200-1 communicates with the communication device 300-1 by using the human body communication with regard to the setting information for establishing the communication with the communication device 100-1, and establishes the communication with the communication device 100-1 based on the setting information. Hence, the user is needless to bring the communication device 100-1 and the communication device 200-1 to a close position, and the communication between the communication devices can be established only by touch of the user wearing or holding the communication device 300-1 on the communication device with which the communication is to be established. As a result, the burden of the user can be reduced, while maintaining the convenience of the user at the time of the communication establishment.

Also, the above setting information includes the setting information of the communication device 100-1, and the communication device 300-1 receives the setting information from the communication device 100-1 by using the human body communication. Also, the communication device 100-1 transmits the setting information to the communication device 300-1 by using the human body communication. Also, the communication device 200-1 receives the setting information from the communication device 300-1 by using the human body communication. Hence, only the setting information of one of the communication devices is communicated, and thereby the overhead for the communication establishment can be reduced as compared with a case in which both types of the setting information are communicated.

2-3. Exemplary Variant

In the above, the first embodiment of the present disclosure has been described. Note that the present embodiment is not limited to the above example. In the following, first to the fourth exemplary variants of the present embodiment will be described.

(First Exemplary Variant)

As the first exemplary variant of the present embodiment, the communication system may cause the user to confirm presence or absence of the transmission authorization, when the communication device 300-1 transmits the setting information of the communication device 100-1 to the communication device 200-1.

Figure 6:
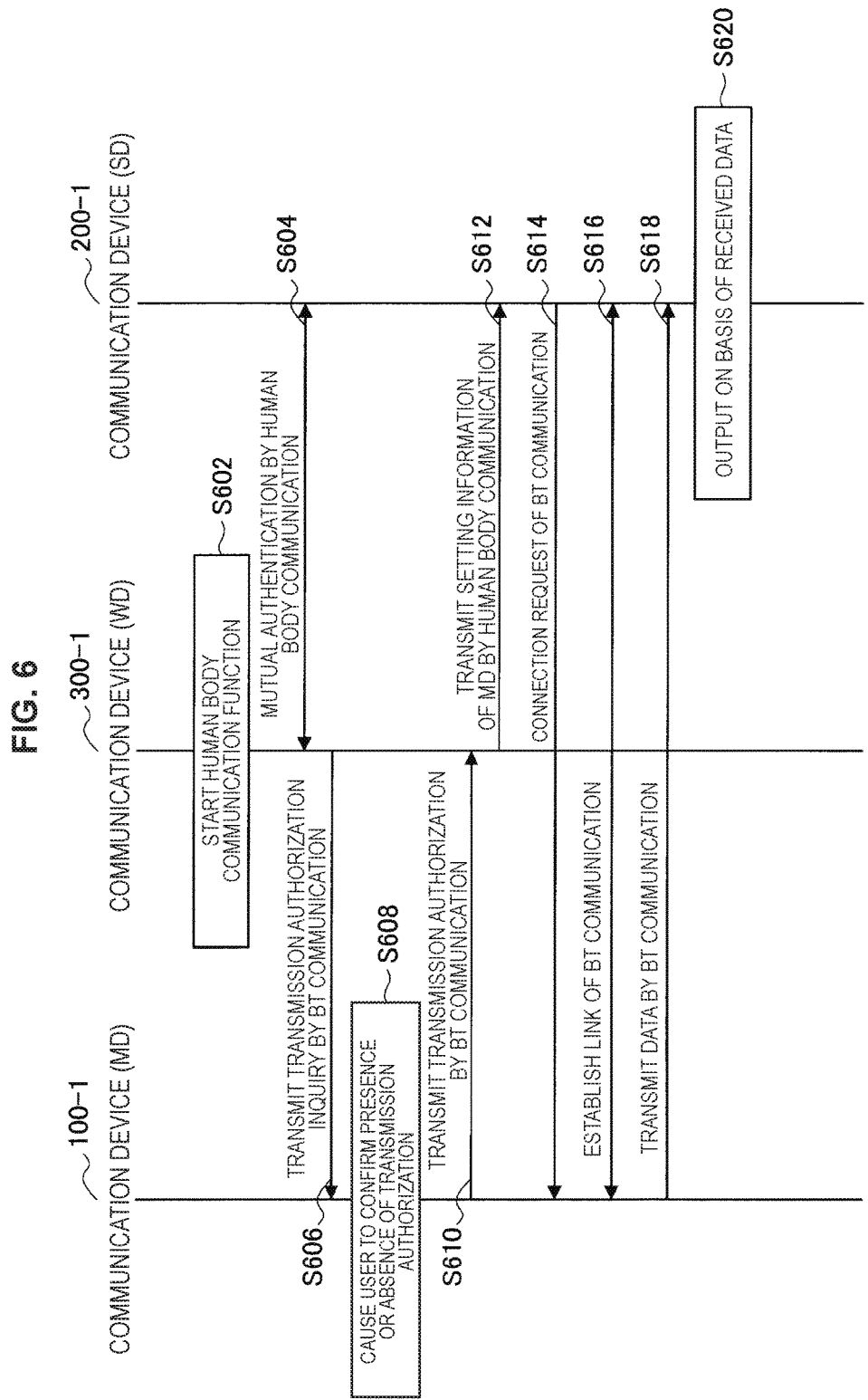
FIG. 6 is a sequence diagram conceptually illustrating a radio wave communication establishment process of a communication system according to a first exemplary variant of the present embodiment.

Specifically, when the communication device 300-1 transmits a transmission authorization inquiry of the setting information of the communication device 100-1 to the communication device 100-1 and the transmission authorization is received from the communication device 100-1, the communication device 300-1 transmits the setting information to the communication device 200-1 by using the radio wave communication. Also, when the communication device 100-1 receives the transmission authorization inquiry of the setting information from the communication device 300-1, the communication device 100-1 presents the fact that the transmission authorization inquiry has been performed to the user, and decides whether or not to authorize the transmission of the setting information on the basis of the user operation that is performed to the presentation. Further, a process of the present exemplary variant will be described in detail with reference to FIG. 6. FIG. 6 is a sequence diagram conceptually illustrating an establishment process of the radio wave communication of the communication system according to the first exemplary variant of the present embodiment. Note that the description of the substantially same processes as the processes of the present embodiment will be omitted.

First, the WD-1 starts the human body communication function (step S602), and the WD-1 and the SD-1 perform mutual authentication by the human body communication (step S604). Note that, when the mutual authentication is not performed, the process of the present step is skipped.

Next, the WD-1 transmits the transmission authorization inquiry to the MD-1 by the BT communication (step S606). Specifically, the control unit 302 transmits, to the radio wave communication unit 308, the transmission authorization inquiry for querying the MD-1, which is a transmission source of the setting information stored in the storage unit 306, about the transmission authorization of the setting information.

The MD-1 that has received the transmission authorization inquiry causes the user to confirm presence or absence of the transmission authorization (step S608). Specifically, when the transmission authorization inquiry is received by the radio wave communication unit 106, the control unit 102 presents to the user the fact that the transmission authorization inquiry has been performed via the display unit or the like that is separately included in the MD-1, and prompts the user to select presence or absence of the transmission authorization. Then, the control unit 102 decides whether to authorize the transmission of the setting information on the basis of the selection operation of the user. Note that information indicating the SD-1 of the transmission destination of the setting information may be included in the transmission authorization inquiry, and the control unit 102 may present the information indicating the SD-1 to the user.

Next, the MD-1 transmits the transmission authorization to the WD-1 by the BT communication (step S610). Specifically, when the selection operation of the user indicates the transmission authorization, the control unit 102 decides to authorize the transmission, and causes the radio wave communication unit 106 to transmit the transmission authorization to the WD-1.

The WD-1 that has received the transmission authorization transmits the setting information of the MD-1 to the SD-1 by the human body communication (step S612). Specifically, when the transmission authorization is received by the human body communication unit 304, the control unit 302 causes the human body communication unit 304 to transmit the setting information of the MD-1 acquired from the storage unit 306 to the SD-1.

The SD-1 that has received the setting information of the MD-1 performs the connection request of the BT communication to the MD-1 (step S614), and the SD-1 and the MD-1 that has received the connection request of the BT communication establish a link of the BT communication (step S616). Then, after the link establishment of the BT communication, the MD-1 transmits the data by the BT communication (step S618), and the SD-1 that has received the data performs output on the basis of the received data (step S620).

As described above, according to the first exemplary variant of the present embodiment, the communication device 300-1 transmits the transmission authorization inquiry of the setting information of the communication device 100-1 to the communication device 100-1, and when the transmission authorization is received from the communication device 100-1, transmits the setting information to the communication device 200-1 by using the human body communication. Hence, the setting information of the MD-1 is prevented from being supplied unconditionally and being accessed from unspecified communication devices, in order to maintain the safety of the information of the MD-1.

Also, when the transmission authorization inquiry of the setting information is received from the communication device 300-1, the communication device 100-1 presents the fact that the transmission authorization inquiry has been performed to the user, and decides whether or not to authorize the transmission of the setting information on the basis of the user operation that is performed to the presentation. Hence, transmission of the setting information is not performed against the intention of the user, and thereby convenience is improved for the user.

Although the above has described an example in which the control unit 102 decides whether or not to authorize the transmission of the setting information on the basis of the user operation, whether or not to authorize the transmission of the setting information may be decided in advance. For example, it can be such that type information indicating the type of the SD-1 that authorizes the transmission is stored in the storage unit 108, and the type information of the SD-1 is included in the information indicating the SD-1 included in the transmission authorization inquiry. Then, the control unit 102 determines whether the type information included in the received transmission authorization inquiry is identical with the type information stored in the storage unit 108, and when determining identical, transmits the transmission authorization to the radio wave communication unit 106. Note that the type information is stored in the storage unit 108 by the setting of the user. In this case, the transmission authorization is transmitted automatically in accordance with the stored setting, and thereby the user's labor is removed along the intention of the user.

(Second Exemplary Variant)

As the second exemplary variant of the present embodiment, when a plurality of types of setting information of the communication device 100-1 exist, the communication device 300-1 may query the communication device 100-1 about which one of setting information to transmit. Specifically, when a plurality of types of setting information of the communication device 100-1 exist, the communication device 300-1 transmits the transmission authorization inquiry to the communication device 100-1, and transmits the setting information indicated by the received transmission authorization to the communication device 200-1 by using the human body communication.

For example, when transmitting the setting information of the MD-1 to the SD-1, the control unit 302 determines whether a plurality of types of setting information are stored in the storage unit 306. If it is determined that a plurality of types of setting information are stored, the control unit 302 transmits the transmission authorization inquiry to each of a plurality of MD-1s of the setting information via the radio wave communication unit 308.

When the transmission authorization inquiry is received, the control unit 102 presents to the user the fact that the transmission authorization inquiry has been performed via the display unit or the like which is included in the MD-1 separately, and prompts the user to select whether or not to authorize the transmission of the setting information. Then, the control unit 102 decides whether or not to authorize the transmission of the setting information on the basis of the selection operation of the user. When deciding to authorize the transmission of the setting information, the control unit 102 causes the radio wave communication unit 106 to transmit the transmission authorization to the WD-1.

When the transmission authorization is received, the control unit 302 causes the human body communication unit 304 to transmit to the SD-1 the setting information of the MD-1 which is a transmission source of the transmission authorization.

As described above, according to the second exemplary variant of the present embodiment, when a plurality of types of setting information of the communication device 100-1 exist, the communication device 300-1 transmits the transmission authorization inquiry to the communication device 100-1, and transmits the setting information indicated by the received transmission authorization to the communication device 200-1 by using the human body communication. Hence, the setting information is prevented from being diffused to unspecified communication devices, and the safety of the information of the MD-1 is maintained.

Note that it may be such that a plurality of types of setting information of the communication devices 100-1 are included in the transmission authorization inquiry, and the setting information for which the transmission is authorized may be decided by the operation of one communication device 100-1. For example, when the setting information of the communication device 100-1 like a smartphone and the communication device 100-1 like a television receiver are registered in the communication device 300-1, the transmission authorization inquiry that includes a list of the setting information is transmitted from the communication device 300-1 to both of the communication devices 100-1. Then, the setting information of the communication device 100-1 for which the transmission is authorized in the smartphone, for example the television receiver, is selected, and the transmission authorization that includes the information indicating the setting information is transmitted from the smartphone to the communication device 300-1. Then, the communication device 300-1 that has received the transmission authorization transmits to the communication device 200-1 the setting information indicated by the transmission authorization. In this case, the setting information for which the transmission is authorized is selected by the other communication device 100-1, and thereby the communication can be established between the communication device 200-1 and the communication device 100-1 for which the user operation is difficult.

(Third Exemplary Variant)

As the third exemplary variant of the present embodiment, when a plurality of types of setting information of the communication device 100-1 exist, the communication device 300-1 may cause the communication device 200-1 to request the connection with regard to each of the plurality of types of setting information. Specifically, when a plurality of types of setting information of the communication device 100-1 exist, the communication device 300-1 transmits a part or all of the plurality of types of setting information to the communication device 200-1 by using the human body communication.

For example, when transmitting the setting information of the MD-1 to the SD-1, the control unit 302 determines whether a plurality of types of setting information are stored in the storage unit 306. When it is determined that a plurality of types of setting information are stored in the storage unit 306, the control unit 302 transmits a part of the plurality of types of setting information to the SD-1 via the human body communication unit 304.

When the plurality of types of setting information are received, the control unit 202 causes the radio wave communication unit 206 to perform the connection request to the MD-1 on the basis of one of the plurality of types of the received setting information. Then, when the communication is not established by the connection request, the radio wave communication unit 206 performs the connection request on the basis of the next setting information. When the communication is not established with regard to all types of the received setting information, the control unit 202 causes the human body communication unit 204 to transmit the transmission request of the setting information to the WD-1.

When the transmission request of the setting information is received, the control unit 302 causes the human body communication unit 304 to transmit to the SD-1 the setting information that is stored in the storage unit 306 and has not been transmitted yet.

Note that, in the first transmission of the setting information, the control unit 302 may cause the human body communication unit 304 to transmit to the SD-1 all types of setting information stored in the storage unit 306.

As described above, according to the third exemplary variant of the present embodiment, when a plurality of types of setting information of the communication device 100-1 exist, the communication device 300-1 transmits a part or all of the plurality of types of setting information to the communication device 200-1 by using the human body communication. Hence, when it is not possible that the setting information of the MD-1 is diffused to unspecified communication devices, the labor for the confirmation of the user can be removed to improve the convenience of the user.

(Fourth Exemplary Variant)

As the fourth exemplary variant of the present embodiment, the communication device 200-1 may discard the setting information, after the communication with the communication device 100-1. Specifically, the control unit 202 causes a storage unit or the like that is included in the communication device 200-1 separately to temporarily store the setting information of the communication device 100-1 which is received from the communication device 300-1. Then, the radio wave communication unit 206 performs the communication with the communication device 100-1 on the basis of the setting information. Then, when the communication with the communication device 100-1 ends, the control unit 202 erases the setting information stored in the storage unit.

As described above, according to the fourth exemplary variant of the present embodiment, the communication device 200-1 discards the setting information after the communication with the communication device 100-1. Hence, the setting information of the MD-1 is prevented from being diffused to other communication devices via the SD-1, and the safety of the information of the MD-1 can be maintained. Also, when there is an upper limit for the number of registrations of the setting information, the number of registrations of the setting information is prevented from reaching the upper limit, and the registration of additional setting information is prevented from becoming difficult.

Note that the communication device 200-1 may delete the setting information that satisfies a predetermined condition, when the registered setting information reaches a predetermined number. For example, when the number of registrations of the setting information reaches the upper limit, the control unit 202 may delete the setting information whose utilization time of the setting information is older than other setting information, and may delete the setting information whose registration time is older than other setting information. Also, when the registered setting information reaches a predetermined number, the communication device 200-1 may delete one or a plurality of types of setting information randomly.

3. SECOND EMBODIMENT (EXAMPLE THAT TRANSMITS SETTING INFORMATION OF SD TO MD VIA HUMAN BODY COMMUNICATION)

In the above, the communication system according to the first embodiment of the present disclosure has been described. Next, a communication system according to a second embodiment of the present disclosure will be described. In the present embodiment, the setting information of the second communication device is transmitted to the first communication device via the third communication device, by using the human body communication.

3-1. Configuration of Communication System

First, a configuration of a communication device 100-2, a communication device 200-2, and a communication device 300-2 according to the second embodiment of the present disclosure will be described. Note that the description of the substantially same configuration as the configuration in the first embodiment will be omitted.

(Configuration of Communication Device 100-2)

The radio wave communication unit 106 receives the setting information for establishing the communication with the communication device 200-2. For example, the radio wave communication unit 106 receives the setting information of the communication device 200-2, as the second setting information, from the communication device 300-2.

Also, the radio wave communication unit 106 establishes the communication with the communication device 200-2 on the basis of the setting information of the communication device 200-2 which is received from the communication device 300-2, and performs transmission and reception of data. For example, the radio wave communication unit 106 transmits a connection request of the BT communication to the communication device 200-2 on the basis of the setting information received from the communication device 300-2, and performs the transmission and reception of the data after the communication establishment.

The storage unit 108 stores the received setting information. For example, the storage unit 108 stores the setting information of the communication device 200-2 which is received by the radio wave communication unit 106.

(Configuration of Communication Device 200-2)

The human body communication unit 204 transmits the setting information for establishing the communication with the communication device 100-2. For example, the human body communication unit 204 transmits the setting information of the communication device 200-2 to the communication device 300-2.

The radio wave communication unit 206 receives the connection request that is transmitted from the communication device 100-2 on the basis of the setting information transmitted by the human body communication unit 204, and establishes the communication based on the connection request. Then, the radio wave communication unit 206 performs the transmission and reception of the data with the communication device 100-2.

(Configuration of Communication Device 300-2)

The control unit 302 controls the radio wave communication unit 308, in the same way as the human body communication unit 304. For example, the control unit 302 starts operating and stops operating the radio wave communication unit 308, and instructs data transmission or the like.

The human body communication unit 304 receives the setting information for establishing the communication between the communication device 100-2 and the communication device 200-2. For example, the human body communication unit 304 receives the setting information of the communication device 200-2 from the communication device 200-2.

The radio wave communication unit 308 transmits the setting information received by the human body communication unit 304. For example, the radio wave communication unit 308 transmits the setting information of the communication device 200-2 which is received by the human body communication unit 304 to the communication device 100-2.

3-2. Process of Communication System

Figure 7:
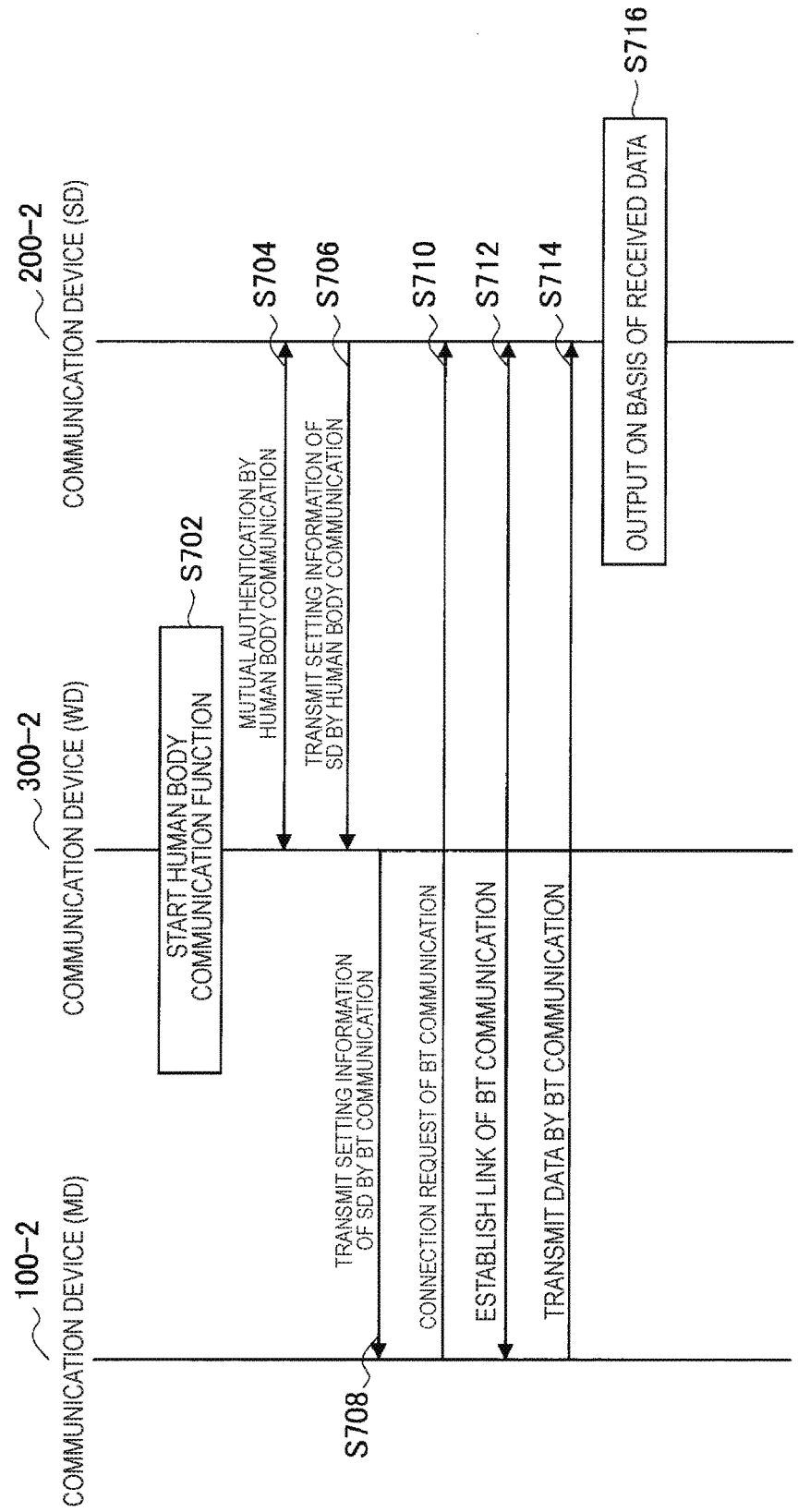
FIG. 7 is a sequence diagram conceptually illustrating a radio wave communication establishment process in a communication system according to a second embodiment of the present disclosure.

Next, an establishment process of the radio wave communication of the communication system according to the present embodiment will be described with reference to FIG. 7. FIG. 7 is a sequence diagram conceptually illustrating the establishment process of the radio wave communication in the communication system according to the present embodiment. Note that the description of the advance registration process of the setting information and other processes which are substantially same as the first embodiment will be omitted.

(Establishment Process of Radio Wave Communication)

First, a WD-2 starts operating the human body communication function (step S702), and the WD-2 and a SD-2 perform mutual authentication by the human body communication (step S704). Note that, when the mutual authentication is not performed, the process of the present step is skipped.

Next, the SD-2 transmits the setting information of the SD-2 to the WD-2 by the human body communication (step S706). Specifically, when the mutual authentication by the human body communication is completed, the control unit 202 causes the human body communication unit 204 to transmit to the WD-2 the setting information of the SD-2 of the radio wave communication. Note that, when a transmission request of the setting information is received from the WD-2, the control unit 202 may cause the human body communication unit 204 to transmit the setting information of the SD-2.

The WD-2 that has received the setting information of the SD-2 transmits the setting information of the SD-2 to an MD-2 by the BT communication (step S708). Specifically, when the setting information of the SD-2 is received by the human body communication unit 304, the control unit 302 causes the radio wave communication unit 308 to transmit the received setting information of the SD-2 to the MD-2. Note that the setting information of the MD-2 which is stored in the storage unit 306 in the advance registration process of the setting information is used at the time of the transmission of the setting information to the MD-2. Also, the control unit 302 may cause the storage unit 306 to store the received setting information of the SD-2.

The MD-2 that has received the setting information of the SD-2 performs a connection request of the BT communication to the SD-2 (step S710). Specifically, when the setting information of the SD-2 is received by the radio wave communication unit 106, the control unit 102 causes the radio wave communication unit 106 to transmit to the SD-2 the connection request of the BT communication based on the received setting information of the SD-2.

Next, the MD-2 and the SD-2 that has received the connection request of the BT communication establish a link of the BT communication (step S712), and after the link establishment of the BT communication, the MD-2 transmits the data to the SD-2 by the BT communication (step S714), and the SD-2 that has received the data performs output on the basis of the received data (step S716). Note that the processes of steps S714 and S716 may be performed in the same way as steps S512 and S514 in the first embodiment.

As described above, according to the second embodiment of the present disclosure, the communication device 300-2 receives the setting information of the communication device 200-2 from the communication device 200-2 by using the human body communication, and transmits the received setting information to the communication device 100-2. Also, the communication device 100-2 receives the setting information of the communication device 200-2 from the communication device 300-2, and establishes the communication with the communication device 200-2 on the basis of the received setting information. Also, the communication device 200-2 transmits the setting information of the communication device 200-2 to the communication device 300-2 by using the human body communication, and receives a communication establishment request from the communication device 100-2 which is transmitted on the basis of the setting information, and establishes the communication with the communication device 100-2 on the basis of the communication establishment request. Hence, the setting information of the communication device 100-2 is not supplied to other communication devices, and thereby the setting information is prevented from being diffused, and the safety of the information of the communication device 100-2 is improved.

Although the above has described an example in which the user touches the communication device 200-2 to establish the BT communication, the user may touch the communication device 100-2 to establish the BT communication. For example, when the setting information of the communication device 200-2 is registered in the communication device 300-2 in advance, the communication device 300-2 transmits the setting information of the communication device 200-2 to the communication device 100-2 via the human body communication in response to the touch of the user on the communication device 100-2. Then, the communication device 100-2 establishes the BT communication with the communication device 200-2.

3-3. Exemplary Variant

In the above, the second embodiment of the present disclosure has been described. Note that the present embodiment is not limited to the above example. In the following, an exemplary variant of the present embodiment will be described.

Figure 8:
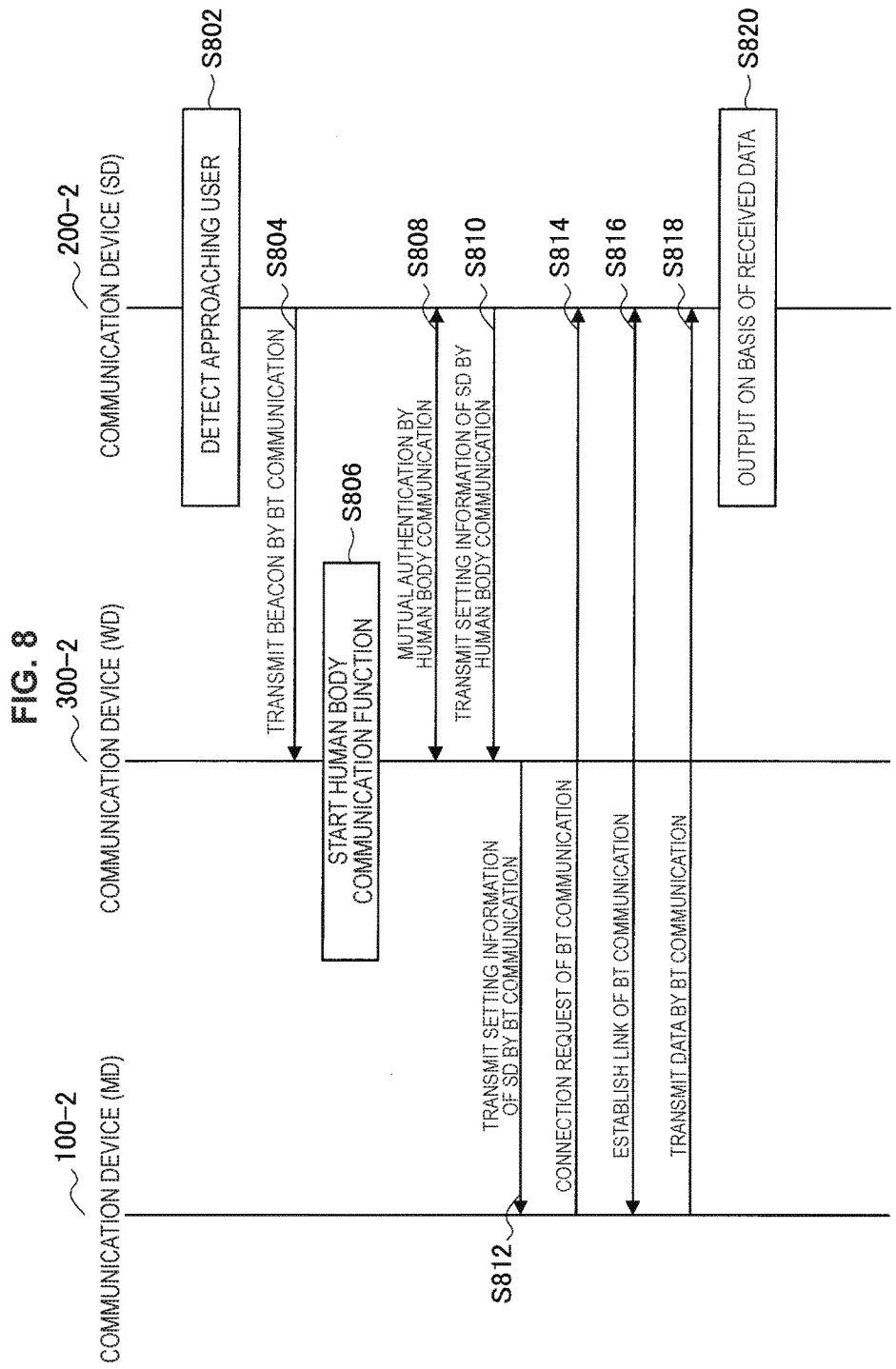
FIG. 8 is a sequence diagram conceptually illustrating a radio wave communication establishment process in a communication system according to an exemplary variant of the present embodiment.

As an exemplary variant of the present embodiment, the communication device 300-2 may be in a sleep state while communication is not performed. Specifically, when a predetermined signal is received from another communication device, the communication device 300-2 changes to a state capable of the human body communication. For example, the communication device 200-2 detects the user approaching the device itself, and when the approaching user is detected, transmits a signal that prompts the human body communication, and the communication device 300-2 that has received the signal changes to the state capable of the human body communication. Further, a process of the present exemplary variant will be described in detail with reference to FIG. 8. FIG. 8 is a sequence diagram conceptually illustrating an establishment process of the radio wave communication in the communication system according to the exemplary variant of the present embodiment. Note that the description of the substantially same processes as the processes of the second embodiment will be omitted.

First, the SD-2 detects the approaching user (step S802). Specifically, the SD-2 includes a sensor that detects the approaching user. For example, the sensor can be a human-sensing sensor such as an infrared sensor, an ultrasonic sensor, or a visible light sensor, and detects approach or touch of the user to the SD-2. Also, instead of the above sensor, a switch such as a push button may detect press action, or a press sensor may detect pressing by the user, in order to detect the approaching user.

When the approaching user is detected, the SD-2 transmits a beacon by the BT communication (step S804). Specifically, when the approaching user is detected by the sensor, the control unit 202 transmits the beacon, for example an advertising packet, to the radio wave communication unit 206. Note that the signal transmitted as the signal that prompts the human body communication is not limited thereto. For example, a predetermined data packet, a control packet, or the like may be transmitted.

When the beacon is received, the WD-2 starts operating the human body communication function (step S806). Specifically, when the beacon is received by the radio wave communication unit 308, the control unit 302 starts operating the human body communication unit 304.

Note that the processes of steps S808 to S820 are substantially same as the processes of steps S704 to S716 of the second embodiment illustrated in FIG. 7, and thus the description will be omitted.

As described above, according to the exemplary variant of the present embodiment, the communication device 300-2 changes to the state capable of the human body communication, when a predetermined signal is received from another communication device. Hence, the human body communication function is set in a sleep state until the communication is started, and thereby the electric power consumption is reduced to operate the communication device 300-3 during a longer term.

Also, the communication device 200-2 detects the user approaching the device itself, and when the approaching user is detected, transmits the signal that prompts the human body communication. Here, in the human body communication, the communication is not performed unless the person that wears the device compatible with the human body communication and the communication device of the communication partner are near. Hence, the human body communication function of the communication device 300-2 worn by the user starts operating only when the user is near the communication device 200-2, and thereby both of reduction of electric power consumption of the communication device 300-2 and efficient human body communication can be achieved.

Although the above has described an example in which the communication device 200-2 transmits the signal that prompts the human body communication, the communication device 100-2 may transmit the signal. For example, the control unit 102 causes the radio wave communication unit 106 to periodically transmit the beacon, or causes the radio wave communication unit 106 to transmit the beacon in accordance with the user operation to the communication device 100-2. In this case, the human body communication function of the communication device 300-2 is started even when the above signal is not transmitted from the communication device 200-2, and thereby the electric power consumption of the communication device 300-2 is reduced, and the communication is prevented from being disconnected.

4. HARDWARE CONFIGURATION ACCORDING TO EMBODIMENT OF PRESENT DISCLOSURE

In the above, the communication devices 100, 200 and 300 (hereinafter, also referred to as the communication device 100 or the like) according to the respective embodiments of the present disclosure have been described. The processes of the above communication device 100 or the like are achieved by cooperation of software and hardware of the communication device 100 or the like described below.

FIG. 9 is an explanatory diagram that illustrates a hardware configuration of the communication device 100 or the like according to the present disclosure. As illustrated in FIG. 9, the communication device 100 or the like includes a central processing unit (CPU) 132, a read only memory (ROM) 134, a random access memory (RAM) 136, a bridge 138, a bus 140, an interface 142, an input device 144, an output device 146, a storage device 148, a drive 150, a connection port 152, and a communication control device 154.

The CPU 132 functions as a computation processing device and a control device, and achieves the operation of the control unit in the communication device 100 or the like by cooperating with various types of programs. Also, the CPU 132 may be a microprocessor. The ROM 134 stores programs, calculation parameters, or the like used by the CPU 132. The RAM 136 temporarily stores the programs used in execution of the CPU 132 or the parameters or the like that changes as appropriate in the execution. A part of the storage unit in the communication device 100 or the like is configured with the ROM 134 and the RAM 136. The CPU 132, the ROM 134, and the RAM 136 are connected to each other by an internal bus composed of a CPU bus and the like.

The input device 144 is composed of an input means for allowing the user to input the information, such as a mouse, a keyboard, a touch panel, a button, a microphone, a switch, and a lever, an input control circuit that generates an input signal on the basis of input by the user and outputs the input signal to the CPU 132, and the like. The user of the communication device 100 or the like can input various types of data to the communication device 100 or the like and instruct processing operation, by operating the input device 144.

The output device 146 performs output to a device such as a liquid crystal display (LCD) device, an organic light emitting diode (OLED) device, and a lamp, for example. Further, the output device 146 may perform audio output of a speaker, a headphone, or the like.

The storage device 148 is a device for data storage. The storage device 148 may include a storage medium, a record device that records data in the storage medium, a reading device that reads out the data from the storage medium, a deleting device that deletes the data recorded in the storage medium, and the like. The storage device 148 stores the programs executed by the CPU 132 and various types of data.

The drive 150 is a reader/writer for the storage medium, and is provided inside or attached outside the communication device 100 or the like. The drive 150 reads out information recorded in a set removable storage medium such as a magnetic disk, an optical disc, a magneto-optical disk, or a semiconductor memory, and outputs the information to the RAM 134. Also, the drive 150 can also write information into the removable storage medium.

The connection port 152 is a bus for connecting to an external information processing apparatus or a peripheral device of the communication device 100 or the like, for example. Also, the connection port 152 may be a universal serial bus (USB).

The communication control device 154 is a communication interface that is configured with a communication device for connecting to a network, as an example of the radio wave communication unit of the communication device 100 or the like, for example. Also, the communication control device 154 may be a wireless local area network (LAN) compatible communication device, and may be a long term evolution (LTE) compatible communication device. Further, the communication control device 154 includes a device for the human body communication.

5. CONCLUSION

In the above, according to the first embodiment of the present disclosure, the user can establish the communication between the communication devices only by touching the communication device without moving the communication device 100 and the communication device 200 to a close position, and can reduce the burden of the user, while maintaining the convenience of the user at the time of the communication establishment. Also, according to the second embodiment of the present disclosure, the setting information of the communication device 100 is not supplied to another communication device, and thereby the setting information is prevented from being diffused, and the safety of the information of the communication device 100 is improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the setting information is transmitted and received between the communication device 100 and the communication device 200 via one communication device 300, but the present technology is not limited to this example. For example, the setting information may be transmitted and received via a plurality of communication devices 300.

Although the above embodiment has described an example in which the communication device 300 stores the setting information of the communication device 100 in the advance registration process, the setting information may be stored in advance in the communication device 300. In this case, the advance registration process is skipped.

Also, the first exemplary variant of the above first embodiment has described an example in which the communication device 300 transmits the transmission authorization inquiry to the communication device 100 by using the human body communication, the communication device 300 may transmit the transmission authorization inquiry to the communication device 100 by using another communication method, for example the BT communication. Note that, when the BT communication is used, the setting information of the communication device 100 stored in the communication device 300 in the advance registration process of the setting information is used in the BT communication.

Also, although the above second embodiment has described an example in which the communication device 200 transmits the setting information of the device itself when the transmission request of the setting information is received from the communication device 300, the communication device 300 may transmit the transmission request to the communication device 200, when the transmission request instruction of the setting information is received from the communication device 100.

For example, the control unit 102 causes the human body communication unit 104 or the radio wave communication unit 106 to transmit the transmission request instruction to the communication device 300, when operation such as data transmission instruction operation to the communication device 200, for example a music reproduction start instruction or display program selection, is performed to the communication device 100. When the transmission request instruction is received and the human body communication can be performed, the control unit 302 causes the human body communication unit 304 to transmit the transmission request to the communication device 200.

In this case, the setting information is acquired from the communication device 200 on the basis of the user operation, and thereby the communication device 200 is prevented from malfunctioning due to the user touching the communication device 200 erroneously to transmit the setting information of the communication device 200.

Also, although the exemplary variant of the above second embodiment has described an example in which the communication device 300 is in a sleep state, the communication device 100 or the communication device 200 may be in a sleep state. For example, the communication device 100 or the communication device 200 changes to a state capable of the human body communication, when a predetermined signal is received from the communication device 300. In this case, the electric power consumption of not only the communication device 300 but also the communication device 100 or the communication device 200 can be reduced.

Also, although the exemplary variant of the above second embodiment has described an example in which the communication device 300 receives a predetermined signal from the communication device 100 or the communication device 200, the predetermined signal may be received by the communication device 300 via another communication device or the like from the communication device 100 or the communication device 200.

Also, although the above embodiment has described an example in which the communication device 300 includes the radio wave communication unit 308, the communication device 300 is needless to include the radio wave communication unit 308. For example, the communication device 300 performs the communication with the communication devices 100 and 200 by using only the human body communication unit 304.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication device including:

a communication unit that communicates with a first communication device or a second communication device by using human body communication, with regard to setting information for establishing communication between the first communication device and the second communication device.

(2)

The communication device according to (1), wherein the setting information includes first setting information which is setting information of the first communication device, and the communication unit receives the first setting information from the first communication device by using the human body communication.

(3)

The communication device according to (2), wherein the communication unit transmits a transmission authorization inquiry of the first setting information to the first communication device, and when a transmission authorization is received from the first communication device, the communication unit transmits the first setting information to the second communication device by using the human body communication.

(4)

The communication device according to (3), wherein when a plurality of pieces of the first setting information exist, the communication unit transmits the transmission authorization inquiry to the first communication device, and transmits a piece of the first setting information indicated by the received transmission authorization to the second communication device by using the human body communication.

(5)

The communication device according to (2) or (3), wherein when a plurality of pieces of the first setting information exist, the communication unit transmits a part or all of the plurality of pieces of the first setting information to the second communication device by using the human body communication.

(6)

The communication device according to any one of (1) to (5), wherein the setting information includes second setting information which is setting information of the second communication device, the communication unit receives the second setting information from the second communication device by using the human body communication, and the communication unit transmits the received second setting information to the first communication device.

(7)

The communication device according to any one of (1) to (6), wherein when a predetermined signal is received from another communication device, the communication unit transitions to a state capable of the human body communication.

(8)

A communication device including a communication unit that communicates with a third communication device by using human body communication with regard to setting information for establishing communication with a second communication device, and establishes communication with the second communication device based on the setting information.

(9)

The communication device according to (8), wherein the setting information includes first setting information which is setting information of the communication device, and the communication unit transmits the first setting information to the third communication device by using the human body communication.

(10)

The communication device according to (9), further including:

a control unit that notifies a user that a transmission authorization inquiry has been made when the transmission authorization inquiry of the first setting information is received from the third communication device, and decides whether or not to authorize transmission of the first setting information on a basis of user operation that is performed with regard to the notification.

(11)

The communication device according to (9) or (10), wherein the setting information includes second setting information which is setting information of the second communication device, the communication unit receives the second setting information from the third communication device, and the communication unit establishes communication that differs from the human body communication with the second communication device on a basis of the received second setting information.

(12)

The communication device according to any one of (8) to (11), wherein the communication unit transmits a signal that prompts the human body communication.

(13)

A communication device including a communication unit that communicates with a third communication device by using human body communication with regard to setting information for establishing communication with a first communication device, and establishes communication with the first communication device based on the setting information.

(14)

The communication device according to (13), wherein the setting information includes first setting information which is setting information of the first communication device, and the communication unit receives the first setting information from the third communication device by using the human body communication.

(15)

The communication device according to (14), wherein the communication unit discards the first setting information, after communication with the first communication device.

(16)

The communication device according to any one of (13) to (15), wherein the setting information includes second setting information which is setting information of the communication device, the communication unit transmits the second setting information to the third communication device by using the human body communication, and the communication unit receives a communication establishment request transmitted from the first communication device on a basis of the second setting information, and establishes communication with the first communication device on a basis of the communication establishment request.

(17)

The communication device according to any one of (13) to (16), further including:

a detection unit for detecting a user approaching the communication device, wherein the communication unit transmits a signal that prompts the human body communication, when the approaching user is detected by the detection unit.

(18)

A communication method including:

transmitting setting information for establishing communication between a first communication device and a second communication device to the first communication device or the second communication device by using human body communication; and establishing the communication between the first communication device and the second communication device on a basis of the setting information.

(19)

A communication system including:

a function for transmitting setting information for establishing communication between a first communication device and a second communication device to the first communication device or the second communication device by using human body communication; and a function for establishing the communication between the first communication device and the second communication device on a basis of the setting information.

REFERENCE SIGNS LIST 100, 200, 300 communication device
102, 202, 302 control unit
104, 204, 304 human body communication unit
106, 206, 308 radio wave communication unit
108, 306 storage unit
208 output unit

The invention claimed is:

1. A third communication device, comprising:
circuitry configured to:
receive, from a first communication device, first setting information of the first communication device based on a first human body communication method;
receive first information from the first communication device, wherein the first information indicates authorization to transmit the first setting information to a second communication device; and
transmit, based on the first information and a second human body communication method, the first setting information of the first communication device to the second communication device,
wherein the first setting information facilitates establishment of communication between the first communication device and the second communication device based on a third communication method.

2. The third communication device according to claim 1, wherein the first setting information indicates pairing information to establish the communication between the first communication device and the second communication device based on the third communication method.

3. The third communication device according to claim 2, wherein the circuitry is further configured to:
transmit an authorization inquiry for the first setting information to the first communication device,
wherein the authorization inquiry includes second information that indicates the second communication device as a transmission destination for the first setting information of the first communication device.

4. The third communication device according to claim 3, wherein the circuitry is further configured to:
store second setting information of at least the first communication device;
transmit the authorization inquiry to at least the first communication device;
receive third information from at least the first communication device, wherein the third information indicates authorization to transmit the second setting information to the second communication device; and
transmit, based on the third information and the second human body communication method, the second setting information of at least the first communication device to the second communication device.

5. The third communication device according to claim 2, wherein the circuitry is further configured to:
store second setting information of at least the first communication device; and
transmit at least one of the first setting information or the second setting information to the second communication device, based on the second human body communication method.

6. The third communication device according to claim 1, wherein the circuitry is further configured to:
receive from the second communication device, third setting information, based on the second human body communication method; and
transmit the third setting information to the first communication device, based on the first human body communication method.

7. The third communication device according to claim 1, wherein the circuitry is further configured to:
receive a signal from one of the first communication device or the second communication device; and
change, based on the received signal, a first state of the third communication device to a second state,
wherein in the second state, the third communication device communicates with the one of the first communication device or the second communication device based on a third human body communication method.

8. The third communication device according to claim 1, wherein the third communication device is one of a wearable device or a handheld device.

9. The third communication device according to claim 1, wherein the third communication method is a wireless communication method.

10. A first communication device, comprising:
circuitry configured to:
transmit, first setting information of the first communication device to a third communication device, based on a human body communication method;
transmit first information to the third communication device, wherein the first information indicates authorization to transmit the first setting information to a second communication device; and
establish communication with the second communication device based on the first setting information and a first communication method.

11. The first communication device according to claim 10, wherein the first setting information indicates pairing information to establish the communication with the second communication device based on the first communication method.

12. The first communication device according to claim 11, wherein the circuitry is further configured to:
receive an authorization inquiry of the first setting information from the third communication device; and
authorize transmission of the first setting information to the second communication device based on a user operation,
wherein the authorization inquiry includes second information that indicates the second communication device as a transmission destination for the first setting information of the first communication device.

13. The first communication device according to claim 11, wherein the circuitry is further configured to:
receive, based on the first setting information, a connection request to establish the communication with the second communication device; and
establish the communication with the second communication device based on the first communication method, wherein the first communication method is different from the human body communication method.

14. The first communication device according to claim 10, wherein the circuitry is further configured to transmit a signal that prompts the human body communication method.

15. A second communication device, comprising:
circuitry configured to:
- receive, from a third communication device, first setting information of a first communication device based on a first human body communication method; and
- transmit, based on the first setting information, a connection request to the first communication device to establish communication with the second communication device,
- wherein the third communication device transmits the first setting information of the first communication device based on first information received from the first communication device,
- wherein the first information indicates authorization to transmit the first setting information to the second communication device, and
- wherein the first setting information facilitates communication with the first communication device based on a first communication method.

16. The second communication device according to claim 15, wherein the first setting information indicates pairing information to establish the communication with the first communication device based on the first communication method.

17. The second communication device according to claim 16, wherein the circuitry is further configured to discard the first setting information after establishment of the communication with the first communication device.

18. The second communication device according to claim 15, wherein the circuitry is further configured to:
- transmit second setting information of the second communication device to the third communication device based on the first human body communication method;
- receive from the first communication device, a connection request to establish the communication with the first communication device, based on the second setting information; and
- establish the communication with the first communication device based on the connection request from the first communication device.

19. The second communication device according to claim 15, wherein the circuitry is further configured to:
- detect an amount of movement of a user towards the second communication device; and
- transmit, based on the amount of movement of the user, a signal to enable the first human body communication method in the second communication.

20. A communication method, comprising:
in a third communication device:
- receiving, from a first communication device, first setting information of the first communication device based on a first human body communication method;
- receiving first information from the first communication device, wherein the first information indicates authorization to transmit the first setting information to a second communication device; and
- transmitting, based on the first information and a second human body communication method, the first setting information of the first communication device to the second communication device,
- wherein the first setting information facilitates establishment of communication between the first communication device and the second communication device based on a third communication method.

21. A communication system, comprising:
a first communication device;
a second communication device; and
a third communication device,
wherein the third communication device comprises circuitry configured to:
- receive, from the first communication device, first setting information of the first communication device based on a first human body communication method;
- receive first information from the first communication device, wherein the first information indicates authorization to transmit the first setting information to the second communication device; and
- transmit, based on the first information and a second human body communication method, the first setting information of the first communication device to the second communication device,
- wherein the first setting information facilitates establishment of communication between the first communication device and the second communication device based on a third communication method.

* * * * *